US008089556B2

(12) United States Patent
Huang et al.

(10) Patent No.: US 8,089,556 B2
(45) Date of Patent: Jan. 3, 2012

(54) FLAT DISPLAY AND DRIVING METHOD THEREOF

(75) Inventors: Jiunn-Yau Huang, Tainan County (TW); Ying-Chou Tu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1244 days.

(21) Appl. No.: 11/790,856

(22) Filed: Apr. 27, 2007

(65) Prior Publication Data

US 2007/0252797 A1 Nov. 1, 2007

(30) Foreign Application Priority Data

Apr. 28, 2006 (TW) ............................... 95115360 A

(51) Int. Cl.
*H04N 7/01* (2006.01)
*H04N 11/20* (2006.01)
*H04N 5/44* (2006.01)
*H04N 3/14* (2006.01)

(52) U.S. Cl. ........ 348/441; 348/452; 348/581; 348/561; 348/790; 348/792

(58) Field of Classification Search .................. 348/581
See application file for complete search history.

(56) References Cited

U.S. PATENT DOCUMENTS

| | | | | |
|---|---|---|---|---|
| 6,141,061 | A * | 10/2000 | Takeuchi | 348/581 |
| 6,198,467 | B1 * | 3/2001 | Chiang | 345/698 |
| 6,219,465 | B1 * | 4/2001 | Nacman et al. | 382/300 |
| 6,441,857 | B1 * | 8/2002 | Wicker et al. | 348/441 |
| 6,614,485 | B2 * | 9/2003 | Shin et al. | 348/452 |
| 2003/0142118 | A1 * | 7/2003 | Funamoto et al. | 345/691 |
| 2004/0212633 | A1 * | 10/2004 | Natori et al. | 345/694 |
| 2006/0017667 | A1 | 1/2006 | Seki et al. | |

FOREIGN PATENT DOCUMENTS

| | | |
|---|---|---|
| TW | 307000 | 6/1997 |
| TW | 200606794 | 2/2006 |

* cited by examiner

*Primary Examiner* — Jefferey Harold
*Assistant Examiner* — Michael Teitelbaum
(74) *Attorney, Agent, or Firm* — Rabin & Berdo, P.C.

(57) ABSTRACT

A method for driving a flat display is disclosed. Each row of the flat display includes N pixels, that is used to display M pixel data in a row of a image frame, wherein M and N are positive integers and M is larger than N. The method includes, in a first time division, the N pixels display N pixel data out of the M pixel data, and in a second time division, the N pixels display the remaining M-N pixel data.

16 Claims, 7 Drawing Sheets

20

50

| T | SP1 | SP2 | SP3 | SP4 | SP5 | SP6 |
|---|---|---|---|---|---|---|
| t1 | R1 | G1 | B1 | R4 | G4 | B4 |
| t2 | - | G2 | (B2+B3)/2 | (R2+R3)/2 | G3 | - |

FIG. 5

60

| T | SP1 | SP2 | SP3 | SP4 | SP5 | SP6 |
|---|---|---|---|---|---|---|
| t1 | R1 | G1 | B1 | R3 | G3 | B3 |
| t2 | - | G2 | B2 | R2 | G4 | B4 |

FIG. 6

FLAT DISPLAY AND DRIVING METHOD THEREOF

This application claims the benefit of Taiwan application Serial No. 95115360, filed Apr. 28, 2006, the subject matter of which is incorporated herein by reference.

BACKGROUND OF THE INVENTION

1. Field of the Invention

The invention relates in general to a flat display and a driving method thereof, and more particularly to a flat display using a few pixels for displaying more pixel data and a driving method thereof.

2. Description of the Related Art

Different flat displays can display image frames with different resolutions. For example, a DVD player can display image frames with 640×480 resolution, and a mobile phone screen can display image frames with 320×240 resolution. However, when the mobile phone screen needs to display an image frame with 640×480 resolution, the image frame has to be transformed in order to be displayed in the mobile phone screen with lower resolution. The image frame with 640×480 resolution is down-scaled to match the resolution of the mobile phone screen.

Please referring to FIG. 1, a block diagram of the down-scaling process of a conventional flat display is illustrated in FIG. 1. The flat display 10 receives an image frame IF. The image frame IF is down-scaled through a down-scaling device 12. Then, an image frame IF' with lower resolution is outputted. Afterwards, a driving circuit 14 drives a panel 16 according to the image frame IF' with lower resolution. In the conventional process, even rows or odd rows of pixel data are selected to down-scale the image frame. Or, even columns or odd columns of pixel data are selected to down-scale the image frame. As a result, the resolution of the image frame IF is lowered directly to obtain the image frame IF' with lower resolution. However, distortion that can be observed obviously occurs in the image frame IF'.

SUMMARY OF THE INVENTION

The invention is directed to a flat display and a driving method thereof. A few pixels are used for displaying more pixel data. As a result, distortion of the transformed image frame is alleviated and not observed easily by human eyes.

According to the present invention, a driving method of a flat display is provided. Each row of the flat display comprises N pixels for displaying M pixel data in one row of an image frame on the flat display in different time divisions. M and N are positive integers, and M is greater than N. A driving method of a flat display comprises following steps. First, in a first time division, N pixels display N pixel data out of the M pixel data. Next, at least in a second time division, the N pixels display the remaining M-N pixel data.

According to the present invention, another driving method of a flat display is provided. The flat display includes at least two rows of pixels. Each two rows includes N pixels for displaying M pixel data in two rows of an image frame on the flat display in different time divisions. M and N are positive integers, and M is greater than N. The driving method of the flat display includes following steps. First, in a first time division, N pixels display the first row of the pixel data out of the M pixel data. Next, in a second time division, the N pixels display the second row of the pixel data out of the M pixel data.

According to the present invention, a flat display including a panel, a storage device, a dynamic detection circuit, a down-scaling device, a pixel data rearrangement device and a driving circuit is provided. The storage device stores a previous image frame. The dynamic detection circuit receives a current image frame and compares the current image frame with the previous image frame to determine if the current image frame is a dynamic image frame or a static image frame. When the current image frame is a static image frame, the down-scaling device is for down-scaling the static image frame and outputting a static image frame with low resolution. When the current image frame is a dynamic image frame, the pixel data rearrangement device is for rearranging the dynamic image frame and outputting a dynamic image frame with low resolution in different time divisions. The driving circuit receives the static image frame with low resolution or the dynamic image frame with low resolution in different time divisions, and outputs those image frames to a panel.

According to the present invention, another driving method of a flat display is provided. First, a current image frame is received. Next, the current image frame is compared with a previous image frame to determine if the current image frame is a dynamic image frame. Then, when the current image frame is a dynamic image frame, the current image frame is rearranged to be a dynamic image frame with low resolution in different time divisions. Afterwards, the dynamic image frame with low resolution in different time divisions is outputted.

The invention will become apparent from the following detailed description of the preferred but non-limiting embodiments. The following description is made with reference to the accompanying drawings.

BRIEF DESCRIPTION OF THE DRAWINGS

FIG. 5 shows distribution of pixel data of a dynamic image frame with low resolution according to a second embodiment of the present invention;

FIG. 6 shows distribution of pixel data of a dynamic image frame with low resolution according to a third embodiment of the present invention;

DETAILED DESCRIPTION OF THE INVENTION

The present invention provides a driving method of a flat display for displaying more pixel data by a few pixels. The distortion of the transformed image frame is alleviated and not observed easily.

Figure 1:
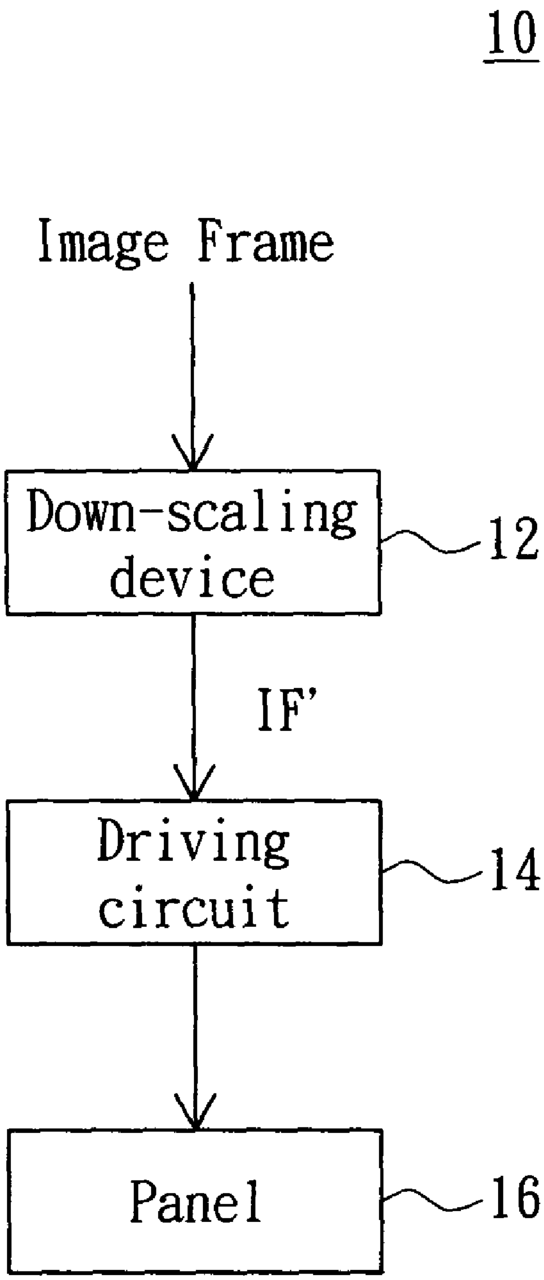
FIG. 1(PRIOR ART)
FIG. 1 (Prior Art) is a block diagram of a down-scaling process of a conventional flat display.
Figure 2:
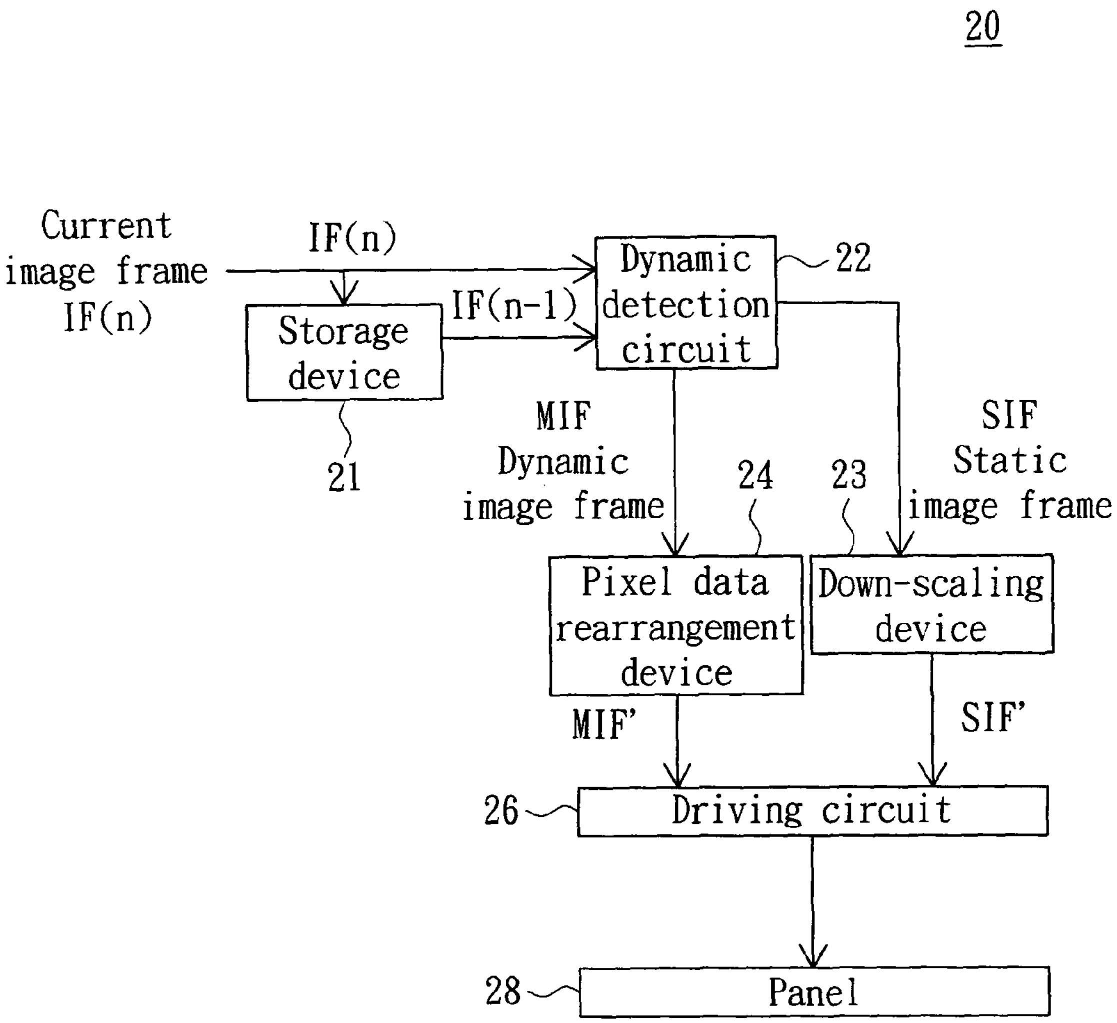
FIG. 2 is a block diagram of a flat display according to a first embodiment of the present invention.

A flat display and a driving method thereof are provided by the present invention. Please referring to FIG. 2, a block diagram of a flat display according to a first embodiment of the present invention is illustrated in FIG. 2. The flat display 20 receives a current image frame IF(n), and then the current image frame IF(n) is used by a dynamic detection circuit 22. For example, the current image frame IF(n) and a previous image frame IF(n−1) stored in a storage device 21 are compared based on conventional brightness profile pattern difference (BPPD) for determining if the current image frame IF(n) is a static image frame SIF or a dynamic image frame MIF.

When the current image frame IF(n) is a static image frame SIF, then the static image frame SIF is transmitted to a downscaling device 23. Then, a static image frame SIF' with lower resolution is outputted. Afterwards, a driving circuit 26 drives a panel 28 according to the static image frame SIF' with lower resolution.

When the current image frame IF(n) is a dynamic image frame MIF, the dynamic image frame MIF is transmitted to a pixel data rearrangement device 24. The dynamic image frame MIF is rearranged to output a dynamic image frame MIF' with lower resolution. Later, the driving circuit 26 drives the panel 28 according the dynamic image frame MIF' with lower resolution. What is worth noticing is that the present invention uses fewer pixels to display more pixel data. Therefore, even through the dynamic image frame MIF' has lower resolution, the distortion of the dynamic image frame MIF' with lower resolution is alleviated and not able to be observed so easily.

A driving method of a flat display is provided by the present invention. The flat display includes N pixels in each row, that is, 3N sub-pixels for displaying M pixel data in each row of an image frame on the flat display in different divisions. M and N are positive integers, and M is larger than N. The driving method of a flat display includes following steps. First, in a first time division, the N pixels display N pixel data out of the M pixel data. Next, at least in a second time division, the N pixels display the remaining M-N pixel data.

Figure 3:
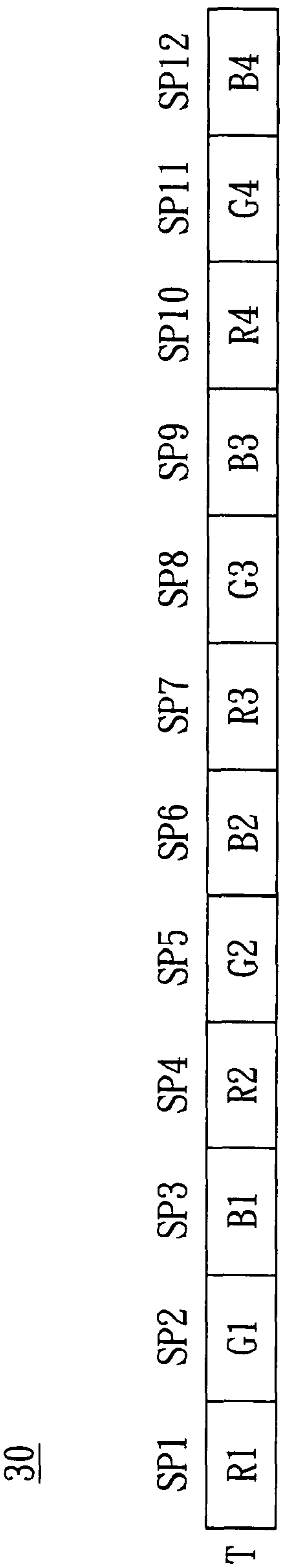
FIG. 3 shows distribution of pixel data of a current image frame according to a first example.
Figure 4:
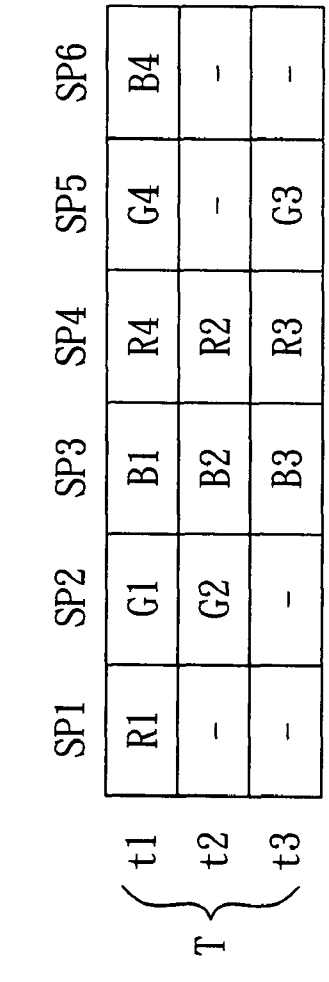
FIG. 4 shows distribution of the pixel data of a dynamic image frame with low resolution according to the first embodiment of the present invention.

Please referring to FIG. 3, distribution of the pixel data of the current image frame according to a first example is illustrated in FIG. 3. For example, each row of the flat display 30 includes four pixels, that is, twelve sub-pixels SP1~SP12, for displaying four pixel data (R1~R4, G1~G4 and B1~B4) in a time period T. Please referring to FIG. 4, distribution of the pixel data of the dynamic image frame with low resolution according to the first embodiment of the present invention is illustrated in FIG. 4. For example, each row of the flat display 40 includes two pixels, that is, 6 sub-pixels SP1~SP6, for displaying the four pixel data in FIG. 3 in different time divisions.

As shown in FIG. 4, in the first time division t1, the first sub-pixel SP1 displays red data R1 of the first pixel data. The second sub-pixel SP2 displays green data G1 of the first pixel data, and the third sub-pixel SP3 displays blue data B1 of the first pixel data. Meanwhile, the fourth sub-pixel SP4 displays red data R4 of the fourth pixel data. The fifth sub-pixel SP5 displays green data G4 of the fourth pixel data, and the sixth sub-pixel SP6 displays blue data B4 of the fourth pixel data.

In a second time division t2, the first sub-pixel SP1 displays the red data with 255 grey levels, that is, black color. In FIG. 4, "-" represents black color. The second sub-pixel SP2 displays green data G2 of the second pixel data, and the third sub-pixel SP3 displays blue data B2 of the second pixel data. The fourth sub-pixel SP4 displays red data R2 of the second pixel data, and the fifth sub-pixel SP5 displays green data "-" with 255 grey levels. The sixth sub-pixel SP6 displays blue data "-" with 255 grey levels.

In a third time division t3, the first sub-pixel SP1 display red data "-" with 255 grey levels. The second sub-pixel SP2 displays green data "-" with 255 grey level, and the third sub-pixel SP3 displays blue data B3 of the third pixel data. The fourth sub-pixel SP4 displays red data R3 of the third pixel data. The fifth sub-pixel SP5 displays green data G3 of the third pixel data, and the sixth sub-pixel SP6 displays blue data "-" with 255 grey levels.

The above method uses a few pixels to display more pixel data in different time divisions. Because human eye retains an image frame for a fraction of a second after it views the image frame, the persistence of vision makes the image frame with low resolution look more saturated and closer to the image frame with original resolution. Therefore, distortion is alleviated.

Please referring to FIG. 5, distribution of pixel data of a dynamic image frame with low resolution according to a second embodiment of the present invention is illustrated in FIG. 5. For example, each row of a flat display 50 includes 2 pixels, that is, 6 sub-pixels SP1~SP6, for displaying four pixel data (R1~R4, G1~G4 and B1~B4) in FIG. 3.

As shown in FIG. 5, in a first time division t1, the first sub-pixel SP1 displays red data R1 of the first pixel data. The second sub-pixel SP2 displays green data G1 of the first pixel data, and the third sub-pixel SP3 displays blue data B1 of the first pixel data. The fourth sub-pixel SP4 displays red data R4 of the four pixel data, and the fifth sub-pixel SP5 displays green data G4 of the fourth pixel data. The sixth sub-pixel SP6 displays blue data B4 of the fourth pixel data.

In a second time division t2, the first sub-pixel displays red data "-" with 255 grey levels. The second sub-pixel SP2 displays green data G2 of the second pixel data, and the third sub-pixel SP3 displays the average value (B2+B3)/2 of the blue data of the second pixel data and the third pixel data. The fourth sub-pixel SP4 displays the average value (R2+R3)/2 of the red data of the second pixel data and the third pixel data. The fifth sub-pixel SP5 displays green data G3 of the third pixel data, and the sixth sub-pixel SP6 displays blue data "-" with 255 grey levels.

Please referring to FIG. 6, distribution of pixel data of a dynamic image frame with low resolution according to a third embodiment of the present invention is illustrated in FIG. 6. For example, each row of a flat display 60 includes two pixels, that is, six sub-pixels, for displaying fourth pixel data (R1~R4, G1~G4 and B1~B4) in FIG. 3.

As shown in FIG. 6, in a first time division t1, the first sub-pixel SP1 displays red data R1 of the first pixel data, and the second sub-pixel SP2 displays green data G1 of the first pixel data. The third sub-pixel SP3 displays blue data B1 of the first pixel data. The fourth sub-pixel SP4 displays red data R3 of the third pixel data, and the fifth sub-pixel SP5 displays green data G3 of the third pixel data. The sixth sub-pixel SP6 displays blue data B3 of the third pixel data.

In a second time division t2, the first sub-pixel SP1 displays red data "-" with 255 grey levels. The second sub-pixel SP2 displays green data G2 of the second pixel data, and the third sub-pixel SP3 displays blue data B2 of the second pixel data. The fourth sub-pixel SP4 displays red data R2 of the second pixel data, and the fifth sub-pixel SP5 displays green data G4 of the fourth pixel data. The sixth sub-pixel SP6 displays blue data B4 of the fourth pixel data.

What is worth noticing is that the above driving method of the flat display skips the red data R4 of the fourth pixel data. However, the image frame observed by human eyes is not affected.

Figure 7:
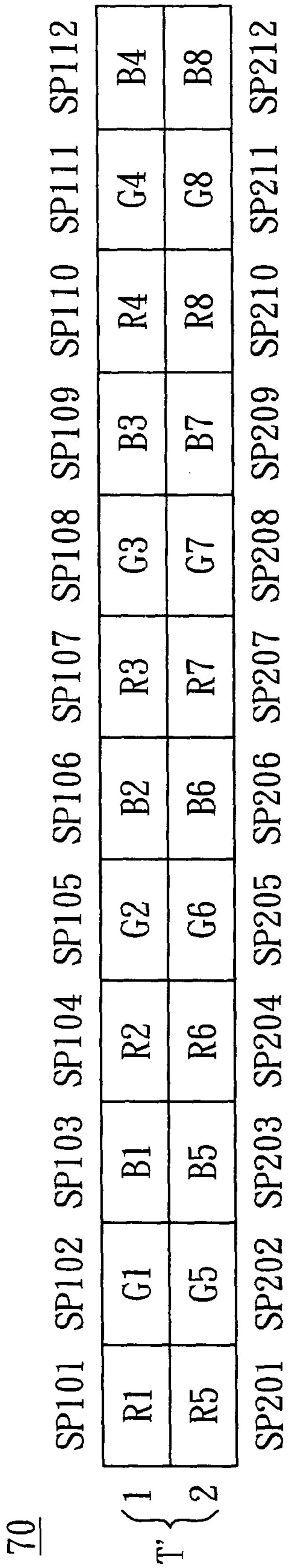
FIG. 7 shows distribution of pixel data of a current image frame of a second example.

Please referring to FIG. 7, distribution of pixel data of a current image frame of a second example is illustrated in FIG.

Figure 8:
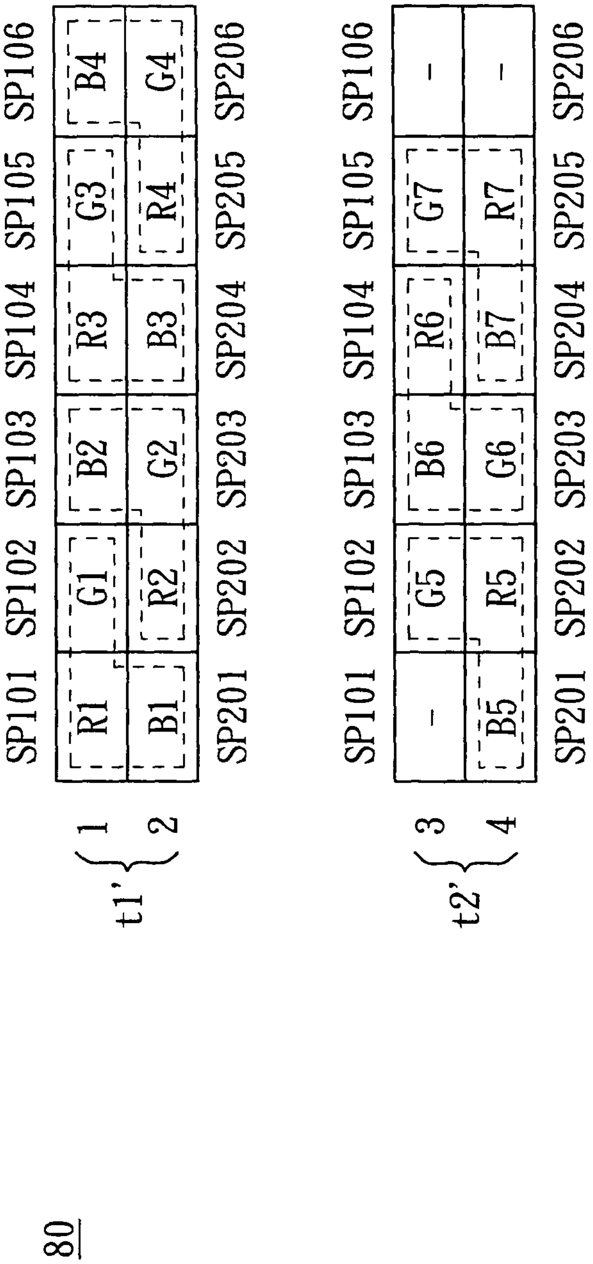
FIG. 8 shows distribution of pixel data of a dynamic image frame with low resolution according to a fourth embodiment of the present invention.

7. A flat display 70 includes at least two rows of pixels. For example, each row includes four pixels. In other words, two rows of the pixels include twenty-four sub-pixels SP101~SP112 and SP201~SP212 for displaying eight pixel data (R1~R8, G1~G8 and B1~B8) in a time period T'. Please referring to FIG. 8, distribution of pixel data of a dynamic image frame with low resolution according to a fourth embodiment of the present invention is illustrated in FIG. 8. A flat display 80 includes at least two rows of pixels. For example, each row includes two pixels. In other words, the two rows include twelve sub-pixels, for displaying eight pixel data of the two rows in FIG. 7 in different time divisions on the flat display 80. The sub-pixels SP101~SP112 of the first row display red data, green data and blue data orderly. The sub-pixels SP201~SP212 of the second row display red data, green data and blue data orderly.

As shown in FIG. 8, in a first time division t1', the first sub-pixel SP101 of the first row displays red data R1 of the first pixel data. The second sub-pixel SP102 of the first row displays green data G1 of the first pixel data. The third sub-pixel SP103 of the first row displays blue data B2 of the second pixel data. The fourth sub-pixel SP104 of the first row displays red data R3 of the third pixel data. The fifth sub-pixel SP105 of the first row displays green data G3 of the third pixel data. The sixth sub-pixel SP106 displays blue data B4 of the fourth pixel data. The first sub-pixel SP 201 of the second row displays blue data B1 of the first pixel data. The second sub-pixel SP202 of the second row displays red data R2 of the second pixel data. The third sub-pixel SP203 of the second row displays green data G2 of the second pixel data. The fourth sub-pixel SP204 of the second row displays blue data B3 of the third pixel data. The fifth sub-pixel SP205 of the second row displays red data R4 of the fourth pixel data. The sixth sub-pixel SP206 of the second row displays green data G4 of the fourth pixel data.

In a second time division t2', the first sub-pixel SP101 of the first row displays red data "-" with 255 grey levels. The second sub-pixel SP102 of the first row displays green data G5 of the fifth pixel data. The third sub-pixel SP103 of the first row displays blue data B6 of the sixth pixel data. The fourth sub-pixel SP104 of the first row displays red data R6 of the sixth pixel data. The fifth sub-pixel SP105 of the first row displays green data G7 of the seventh pixel data. The sixth sub-pixel SP106 of the first row displays blue data "-" with 255 grey levels. The first sub-pixel SP201 of the second row displays blue data B5 of the fifth pixel data. The second sub-pixel SP202 of the second row displays red data R5 of the fifth pixel data. The third sub-pixel SP203 of the second row displays green data G6 of the sixth pixel data. The fourth sub-pixel SP204 of the second row displays blue data B7 of the seventh pixel data. The fifth sub-pixel SP205 of the second row displays red data R7 of the seventh pixel data. The sixth sub-pixel SP206 of the second row displays green data "-" with 255 grey levels.

What is worth noticing is that the above driving method of a flat display skips the eighth pixel data. However, the image frame observed by human eyes is not affected.

Figure 9:
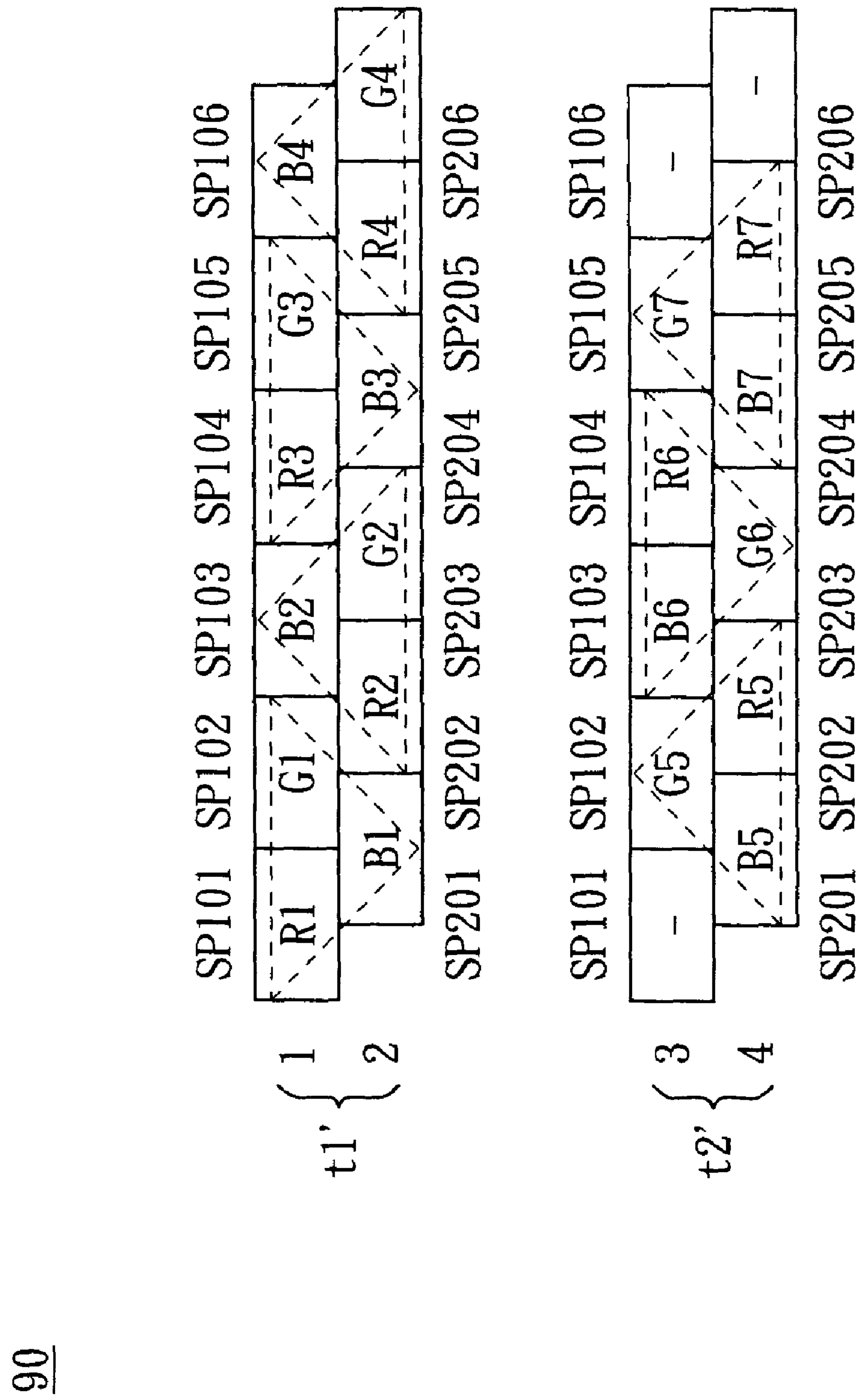
FIG. 9 shows distribution of pixel data of a dynamic image frame with low resolution according to a fifth embodiment of the present invention.

Please referring to FIG. 9, distribution of pixel data of a dynamic image frame with low resolution according to a fifth embodiment of the present invention is illustrated in FIG. 9. Compared to the first row of the pixels, the second row of the pixels shifts a distance to the right. The distance is equal to half of the width of one sub-pixel. Other parts of the present embodiment are the same as the fourth embodiment and not described repeatedly.

Figure 10:
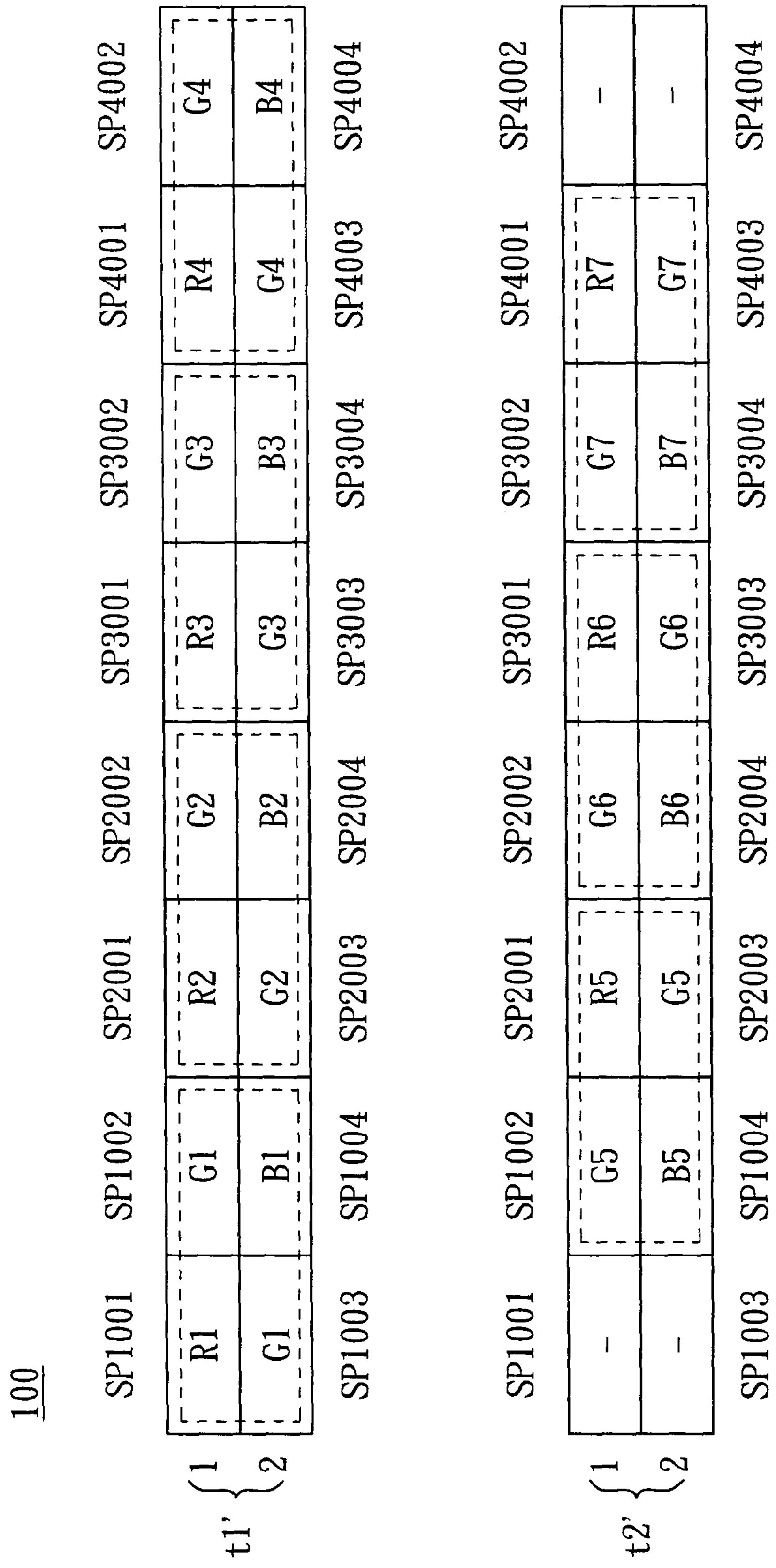
FIG. 10 shows distribution of pixel data of a current image frame according to a sixth embodiment of the present invention.

Please referring to FIG. 10, distribution of pixel data of a current image frame according to a sixth embodiment of the present invention is illustrated in FIG. 10. For example, each two rows of a flat display 100 include four pixels, for displaying the eight pixel data (R1~R8, G1~G8 and B1~B8) in FIG. 7 on the flat display 100 in different time divisions. Each pixel includes four sub-pixels in two rows. The first sub-pixel is disposed to the upper left of the pixel, and the second sub-pixel is disposed to the upper right of the pixel. The third sub-pixel is disposed to the lower left of the pixel, and the fourth sub-pixel is disposed the lower right of the pixel.

As shown in FIG. 10, in a first time division t1', the first sub-pixel SP1001 of the first pixel displays red data R1 of the first pixel data. The second sub-pixel SP1002 of the first pixel displays green data G1 of the first pixel data. The third sub-pixel SP1003 of the first pixel displays green data G1 of the first pixel data. The fourth sub-pixel SP1004 of the first pixel displays blue data B1 of the first pixel data. The first sub-pixel SP2001 of the second pixel displays red data R2 of the second pixel data. The second sub-pixel SP2002 of the second pixel displays green data G2 of the second pixel data. The third sub-pixel SP2003 of the second pixel displays green data G2 of the second pixel data. The fourth sub-pixel SP2004 of the second pixel displays blue data B2 of the second pixel data. The first sub-pixel SP3001 of the third pixel displays red data R3 of the third pixel data. The second sub-pixel SP3002 of the third pixel displays green data G3 of the third pixel data. The third sub-pixel of the third pixel SP3003 displays green data G3 of the third pixel data. The fourth sub-pixel SP3004 of the third pixel displays blue data B3 of the third pixel data. The first sub-pixel SP4001 of the fourth pixel displays red data R4 of the fourth pixel data. The second sub-pixel SP4002 of the fourth pixel displays green data G4 of the fourth pixel data. The third sub-pixel SP4003 of the fourth pixel displays green data G4 of the fourth pixel data. The fourth sub-pixel SP4004 of the fourth pixel displays blue data B4 of the fourth pixel data.

In a second time division t2', the first sub-pixel SP1001 of the first pixel displays red data "-" with 255 grey levels. The second sub-pixel SP1002 of the first pixel displays green data G5 of the fifth pixel data. The third sub-pixel SP1003 of the first pixel displays green data "-" with 255 grey levels. The fourth sub-pixel SP1004 of the first pixel displays blue data B5 of the fifth pixel data. The first sub-pixel SP2001 of the second pixel displays red data R5 of the fifth pixel data. The second sub-pixel SP2002 of the second pixel displays green data G6 of the sixth pixel data. The third sub-pixel SP2003 of the second pixel displays green data G5 of the fifth pixel data. The fourth sub-pixel SP2004 of the second pixel displays blue data B6 of the sixth pixel data. The first sub-pixel SP3001 of the third pixel displays red data R6 of the sixth pixel data. The second sub-pixel SP3002 of the third pixel displays green data G7 of the seventh pixel data. The third sub-pixel SP3003 of the third pixel displays green data G6 of the sixth pixel data. The fourth sub-pixel SP3004 of the third pixel displays blue data B7 of the seventh pixel data. The first sub-pixel SP4001 of the fourth pixel displays red data R7 of the seventh pixel data. The second sub-pixel SP4002 of the fourth pixel displays green data "-" with 255 grey levels. The third sub-pixel SP4003 of the fourth pixel displays green data G7 of the seventh pixel data. The fourth sub-pixel SP4004 of the fourth pixel displays blue data "-" with 255 grey levels.

What is worth noticing is that the above driving method of a flat display skips the eighth pixel data.

In the driving method of the above embodiments of the present invention, a few pixels are used for displaying more pixel data. Therefore, distortion of the transformed image frame is alleviated and not observed by human eyes so easily.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A driving method of a flat display, each row of the flat display comprising N pixels for displaying M pixel data in a row of an image frame on the flat display in different time divisions, M and N being positive integers and M being greater than N, the driving method comprising:
- in a first time division, N pixels displaying N pixel data out of the M pixel data; and
- at least in a second time division, the N pixels displaying the remaining M-N pixel data;
- wherein
- each two pixels in one row of the flat display are used for displaying four pixel data;
- in the first time division, the two pixels displaying two pixel data out of the four pixel data; and
- at least in the second time division, the two pixels displaying the remaining two pixel data.

2. The method according to claim 1, wherein each pixel comprises three sub-pixels, the two pixels comprising six sub-pixels, the driving method comprising:
- in the first time division, the first sub-pixel displaying a first color data of the first pixel data, the second sub-pixel displaying a second color data of the first pixel data, the third sub-pixel displaying a third color data of the first pixel data, the fourth sub-pixel displaying the first color data of the fourth pixel data, the fifth sub-pixel displaying the second color data of the fourth pixel data, the sixth sub-pixel displaying the third color data of the fourth pixel data;
- in the second time division, the first sub-pixel displaying the first color data with n grey levels, the second sub-pixel displaying the second color data of the second pixel data, the third sub-pixel displaying the third color data of the second pixel data, the fourth sub-pixel displaying the first color data of the second pixel data, the fifth sub-pixel displaying the second color data with n grey levels, the sixth sub-pixel displaying the third color data with n grey levels; and
- in a third time division, the first sub-pixel displaying the first color data with n grey levels, the second sub-pixel displaying the second color data with n grey levels, the third sub-pixel displaying the third color data of the third pixel data, the fourth sub-pixel displaying the first color data of the third pixel data, the fifth sub-pixel displaying the second color data of the third pixel data, the sixth sub-pixel displaying the third color data with n grey levels.

3. The method according to claim 1, wherein the each pixel comprises three sub-pixels, the two pixels comprising six sub-pixels, the driving method comprising:
- in the first time division, the first sub-pixel displaying the first color data of the first pixel data, the second sub-pixel displaying the second color data of the first pixel data, the third sub-pixel displaying the third color data of the first pixel data, the fourth sub-pixel displaying the first color data of the fourth pixel data, the fifth sub-pixel displaying the second color data of the fourth pixel data, the sixth sub-pixel displaying the third color data of the fourth pixel data; and
- in the second time division, the first sub-pixel displaying the first color data with n grey levels, the second sub-pixel displaying the second color data of the second pixel data, the third sub-pixel displaying the average value of the third color data of the second pixel data and the third pixel data, the fourth sub-pixel displaying the average value of the first color data of the second pixel data and the third pixel data, the fifth sub-pixel displaying the second color data of the third pixel data, the sixth sub-pixel displaying the third color data with n grey levels.

4. The method according to claim 1, wherein each pixel comprises three sub-pixels, the two pixels comprising six sub-pixels, the driving method comprising:
- in the first time division, the first sub-pixel displaying the first color data of the first pixel data, the second sub-pixel displaying the second color data of the first pixel data, the third sub-pixel displaying the third color data of the first pixel data, the fourth sub-pixel displaying the first color data of the third pixel data, the fifth sub-pixel displaying the second color data of the third pixel data, the sixth sub-pixel displaying the third color data of the third pixel data; and
- in the second time division, the first sub-pixel displaying the first color data with n grey levels, the second sub-pixel displaying the second color data of the second pixel data, the third sub-pixel displaying the third color data of the second pixel data, the fourth sub-pixel displaying the first color data of the second pixel data, the fifth sub-pixel displaying the second color data of the fourth pixel data, the sixth sub-pixel displaying the third color data of the fourth pixel data.

5. The method according to claim 4, wherein the first color data of the fourth pixel data is skipped.

6. A driving method of a flat display, the flat display comprising at least two rows of pixels, each two rows of pixels comprising N pixels for displaying M pixel data in two rows of an image frame on the flat display in different time divisions, M and N being positive integers, M being greater than N, the driving method, comprising:
- in a first time division, the N pixels displaying the first row of the pixel data out of the M pixel data, and
- in a second time division, the N pixel displaying the second row of the pixel data out of the of the M pixel data.

7. The method according to claim 6, wherein each two rows of the flat display comprises four pixels for displaying eight pixel data in two rows of the image frame, each pixel comprising three sub-pixels, the four pixels comprising twelve sub-pixels, the driving method of the flat display comprising:
- in a first time division, the first sub-pixel of the first row displaying a first color data of the first pixel data in the first row, the second sub-pixel of the first row displaying a second color data of the first pixel data in the first row, the third sub-pixel of the first row displaying a third color data of the second pixel data in the first row, the fourth sub-pixel of the first row displaying the first color data of the third pixel data in the first row, the fifth sub-pixel of the first row displaying the second color data of the third pixel data in the first row, the sixth sub-pixel of the first row displaying the third color data of the fourth pixel data in the first row, the first sub-pixel of the second row displaying the third color data of the first pixel data in the first row, the second sub-pixel of the second row displaying the first color data of the second pixel data in the first row, the third sub-pixel of the second row displaying the second color data of the second pixel data of the first row, the fourth sub-pixel of the second row displaying third color data of the third pixel data of the first row, the fifth sub-pixel of the second row displaying the first color data of the fourth pixel data of the first row, the sixth sub-pixel of the second row displaying the second color data of the fourth pixel data of the first row; and in a second time division, the first sub-pixel of the first row displaying a first color data with n grey levels, the second sub-pixel of the first row displaying a second color data of the first pixel data in the second row, the third sub-pixel of the first row displaying a third color data of the second pixel data in the second row, the fourth sub-pixel of the first row displaying the first color data of the second pixel data in the second row, the fifth sub-pixel of the first row displaying the second color data of the third pixel data in the second row, the sixth sub-pixel of the first row displaying the third color data with n grey levels, the first sub-pixel of the second row displaying the third color data of the first pixel data in the second row, the second sub-pixel of the second row displaying the first color data of the first pixel data in the second row, the third sub-pixel of the second row displaying the second color data of the second pixel data of the second row, the fourth sub-pixel of the second row displaying third color data of the third pixel data of the second row, the fifth sub-pixel of the second row displaying the first color data of the third pixel data of the second row, the sixth sub-pixel of the second row displaying the second color data with n grey levels.

8. The method according to claim 7, wherein the fourth pixel data of the second row is skipped.

9. The method according to claim 8, wherein the pixels in the second row shift a distance to the right, the distance equal to half of the width of one sub-pixel.

10. The method according to claim 6, wherein the four pixels in two rows of the flat display are for displaying eight pixel data in two rows of the image frame in different time divisions, each pixel comprising four sub-pixels, a first sub-pixel disposed to the upper left of the pixel, a second sub-pixel disposed to the upper right of the pixel, a third sub-pixel disposed to the lower left, a fourth sub-pixel disposed the lower right of the pixel, the driving method comprising:

in a first time division, the first sub-pixel of the first pixel displaying a first color data of the first pixel data in the first row, the second sub-pixel of the first pixel displaying a second color data of the first pixel data in the first row, the third sub-pixel of the first pixel displaying the second color data of the first pixel data in the first row, the fourth sub-pixel of the first pixel displaying the third color data of the first pixel data in the first row, the first sub-pixel of the second pixel displaying the first color data of the second pixel data in the first row, the second sub-pixel of the second pixel displaying the second color data of the second pixel data in the first row, the third sub-pixel of the second pixel displaying the second color data of the second pixel data in the first row, the fourth sub-pixel of the second pixel displaying the third color data of the second pixel data in the first row, the first sub-pixel of the third pixel displaying the first color data of the third pixel data in the first row, the second sub-pixel of the third pixel displaying the second color data of the third pixel data in the first row, the third sub-pixel of the third pixel displaying the second color data of the third pixel data in the first row, the fourth sub-pixel of the third pixel displaying the third color data of the third pixel data in the first row, the first sub-pixel of the fourth pixel displaying the first color data of the fourth pixel data in the first row; the second sub-pixel of the fourth pixel displaying the second color data of the fourth pixel data in the first row, the third sub-pixel of the fourth pixel displaying the second color data of the fourth pixel data in the first row, the fourth sub-pixel of the fourth pixel displaying the third color data of the fourth pixel data in the first row; and in a second time division, the first sub-pixel of the first pixel displaying the first color data with n grey levels, the second sub-pixel of the first pixel displaying the second color data of the first pixel data in the second row, the third sub-pixel of the first pixel displaying the second color data with n grey levels, the fourth sub-pixel of the first pixel displaying the third color data of the first pixel data in the second row, the first sub-pixel of the second pixel displaying the first color data of the first pixel data in the second row, the second sub-pixel of the second pixel displaying the second color data of the second pixel data in the second row, the third sub-pixel of the second pixel displaying the second color data of the first pixel data in the second row, the fourth sub-pixel of the second pixel displaying the third color data of the second pixel data in the second row, the first sub-pixel of the third pixel displaying the first color data of the second pixel data in the second row, the second sub-pixel of the third pixel displaying the second color data of the third pixel data in the second row, the third sub-pixel of the third pixel displaying the second color data of the second pixel data in the second row, the fourth sub-pixel of the third pixel displaying the third color data of the third pixel data in the second row, the first sub-pixel of the fourth pixel displaying the first color data of the third pixel data in the second row, the second sub-pixel of the fourth pixel displaying the second color data with n grey levels, the third sub-pixel of the fourth pixel displaying the second color data of the third pixel data in the second row, the fourth sub-pixel of the fourth pixel displaying the third color data with n grey levels.

11. The method according to claim 10, wherein the eighth pixel data is skipped.

12. A flat display comprising:

a panel;

a storage device for storing a previous image frame;

a dynamic detection circuit for receiving a current image frame and comparing the current image frame and the previous image frame to determine if the current image frame is dynamic or static;

a down-scaling device for down-scaling the current image frame and outputting a static image frame with a resolution lower than that of the current image frame when the current image frame is static;

a pixel data rearrangement device for rearranging the pixels of the current image frame and outputting a dynamic image frame in different time divisions when the current image frame is dynamic, the dynamic image frame having a resolution lower than that of the current image frame; and a driving circuit for receiving the static image frame or the dynamic image frame in different time divisions and outputting to the panel.

13. A driving method of a flat display, the method comprising:

receiving a current image frame;

comparing the current image frame with a previous image frame to determine if the current image frame is dynamic;

when the current image frame is dynamic, rearranging the current image frame to a dynamic image frame in different time divisions, the dynamic image frame having a resolution lower than that of the current image frame; and outputting the dynamic image frame in different time divisions.

14. The method according to claim 13, wherein the current image frame is static when the current image frame is not dynamic.

15. The method according to claim 14, wherein the current image frame is down-scaled to a static image frame with a resolution lower than that of the current image frame and the static image frame is outputted when the current image frame is static.

16. The method according to claim 13, wherein it is determined if the current image frame is dynamic based on brightness profile pattern difference (BPPD).

* * * * *